United States Patent
Gorissen et al.

(10) Patent No.: US 7,881,466 B2
(45) Date of Patent: Feb. 1, 2011

(54) METHOD AND SYSTEM FOR OBFUSCATING A CRYPTOGRAPHIC FUNCTION

(75) Inventors: Paul Gorissen, Eindhoven (NL);
Norbert C. Esser, San Jose, CA (US);
Willem Mallon, Eindhoven (NL);
Joachim Artur Trescher, Eindhoven (NL)

(73) Assignee: Irdeto B.V. (NL)

( * ) Notice: Subject to any disclaimer, the term of this patent is extended or adjusted under 35 U.S.C. 154(b) by 842 days.

(21) Appl. No.: 11/577,829

(22) PCT Filed: Oct. 24, 2005

(86) PCT No.: PCT/IB2005/053468
§ 371 (c)(1),
(2), (4) Date: Apr. 24, 2007

(87) PCT Pub. No.: WO2006/046187
PCT Pub. Date: May 4, 2006

(65) Prior Publication Data
US 2009/0122978 A1     May 14, 2009

(30) Foreign Application Priority Data
Oct. 28, 2004     (EP) .................... 04105373

(51) Int. Cl.
*H04K 1/00*     (2006.01)
(52) U.S. Cl. .................... 380/28; 380/29; 713/194; 713/155; 713/168; 713/193

(58) Field of Classification Search .................... 380/28, 380/29; 726/16, 20; 713/194, 155, 168, 713/189, 193
See application file for complete search history.

(56) References Cited

U.S. PATENT DOCUMENTS

| 6,658,569 B1 | 12/2003 | Patarin et al. |
| 2001/0053220 A1 | 12/2001 | Kocher et al. |

FOREIGN PATENT DOCUMENTS

| WO | 0131422 A | 5/2001 |

OTHER PUBLICATIONS

S. Chow, H. Johnson, P. C. van Oorschot, and P. Eisen. A White-Box DES Implementation for DRM Applications. In ACM CCS-9 Workshop DRM 2002.*

* cited by examiner

*Primary Examiner*—Ian N Moore
*Assistant Examiner*—Brian Shaw
(74) *Attorney, Agent, or Firm*—Schwegman, Lundberg & Woessner, P.A.

(57) ABSTRACT

Embodiments include a system, wherein a server provides a cryptographic function F to an execution device in an obfuscated form. The function F composes output of a plurality of the mapping tables $T_i$ ($0 \leq i \leq n$; $n \geq 1$) using an Abelian group operator. A processor chooses tables O and C such that $C[x] O[x]=0$, $x \, D_i$ and creates tables $T'_i$, $0 \leq i \leq m$; $n \leq m \leq n+1$, where for $0 \leq i \leq n$, each Table $T'_i$ represents the respective corresponding table $T_i$ and at least one table $T'_{o_1}$, $0 \leq o_1 \leq n$, being formed through an Abelian composition of $T_{o_1}$ and O, and at least one table $T'_{c_1}$, $0 \leq c_1 \leq m$, $c_1 \neq o_j$; being formed through an Abelian composition that includes C.

21 Claims, 2 Drawing Sheets

METHOD AND SYSTEM FOR OBFUSCATING A CRYPTOGRAPHIC FUNCTION

FIELD OF THE INVENTION

The invention relates to a method of obfuscating a cascaded cryptographic function. The invention also relates to a system for supplying a cascaded cryptographic function to an execution device in an obfuscated way. The invention further relates to an execution device for executing a cascaded cryptographic function provided in an obfuscated way.

BACKGROUND OF THE INVENTION

The Internet provides users with convenient and ubiquitous access to digital content. Because of the potential of the Internet as a powerful distribution channel, many CE products strive to directly access the Internet or to interoperate with the PC platform—the predominant portal to the Internet. The CE products include, but are not limited to, digital set top boxes, digital TVs, game consoles, PCs and, increasingly, hand-held devices such as PDAs, mobile phones, and mobile storage and rendering devices, such as Apple's iPod. The use of the Internet as a distribution medium for copyrighted content creates the compelling challenge to secure the interests of the content provider. In particular it is required to warrant the copyrights and business models of the content providers. Increasingly, CE platforms are operated using a processor loaded with suitable software. Such software may include the main part of functionality for rendering (playback) of digital content, such as audio and/or video. Control of the playback software is one way to enforce the interests of the content owner including the terms and conditions under which the content may be used. Where traditionally many CE platforms (with the exception of a PC and PDA) used to be closed, nowadays more and more platforms at least partially are open. In particular for the PC platform, some users may be assumed to have complete control over the hardware and software that provides access to the content and a large amount of time and resources to attack and bypass any content protection mechanisms. As a consequence, content providers must deliver content to legitimate users across a hostile network to a community where not all users can be trusted. The general approach in digital rights management for protected content distributed to CE platforms is to encrypt the digital content (for instance using DES or AES) and to store the decryption key (or the "license") in a so-called License database (for a PC, the License database is typically stored on the PC's hard disk). The largest vulnerability of digital rights management relying on encryption is the key distribution and handling. For playback, a software player has to retrieve a decryption key from the license database, it then has to store this decryption key somewhere in memory for the decryption of the encrypted content. This leaves an attacker two options for an attack of the key handling in a software player: firstly, reverse engineering of the license database access function could result in a black box software (i.e., the attacker does not have to understand the internal workings of the software function) capable of retrieving asset keys from all license databases. Secondly, by observation of the accesses to memory used during content decryption it is possible to retrieve the asset key.

Typically, digital rights management systems use an encryption technique based on block ciphers that process the data stream in blocks using a sequence of encryption/decryption steps, referred to as rounds. During each round, a round-specific function is performed. The round-specific function may be based on a same round function that is executed under control of a round-specific sub-key. For many encryption systems, the round function is specified using mapping tables for different parts of the domain of the function. Even if no explicit tables were used, nevertheless frequently tables are used for different parts of the domain of the function for efficient execution in software of encryption/decryption functions. The computer code accesses or combines table values into the range value of the function. Instead of distributing keys, that may be user-specific, it becomes more interesting to distribute user specific algorithms instead of keys for en- or decryption algorithms. These algorithms, most often functions (mappings), have to be obfuscated (hidden) in order to prevent redesign or prohibit the re-computation of elements that are key-like. On computers, tables accompanied with some computer code often represent these functions.

SUMMARY OF THE INVENTION

It is an object of the invention to provide a method, system and execution device of the type set forth with better protection of a cascaded cryptographic function such as a Feistel network.

To meet the object of the invention, a method of obfuscating a cryptographic function F that cryptographically converts an input x from a predetermined domain D to an output y using a plurality of non-linear mapping tables $T_i$ ($0 \leq i \leq n$; $n \geq 1$), each with key-like information and operating on a respective part $D_i$ of the domain D, the function F composing output of the mapping tables using an Abelian group operator $\otimes$ (for example, $F(x)=T_0[x_0] \otimes \ldots \otimes T_n[x_n]$, $x=(x_0, x_1, \ldots, x_n)$, $x_i \in D_i$), includes:

choosing a table O and a table C such that $C[x] \otimes O[x]=0$, $\forall x \in D_i$;

creating a plurality of tables $T'_i$, $0 \leq i \leq m$; $n \leq m \leq n+1$, where for $0 \leq i \leq n$, each table $T'_i$ represents the respective corresponding table $T_i$ and at least one of those tables $T'_{o_1}$, $0 \leq o_1 \leq n$, hereinafter referred to as obfuscated table, being formed through a composition, using the Abelian group operator, of the corresponding table $T_{o_1}$ and the table O (for example, $T'_{o_1}[x]=O[x] \otimes T_{o_1}[x]$, $\forall x \in D_{o_1}$), and at least one of the other tables $T'_{c_1}$, $0 \leq c_1 \leq m$, $c_1 \neq o_1$, hereinafter referred to as compensating table, being formed through a composition, using the Abelian group operator, that includes the table C (for example, $T'_{c_1}[x]=C[x] \otimes T_{c_1}[x]$, $\forall x \in D_{c_1}$); and forming an obfuscated function F' that is functionally equivalent to the cryptographic function F by composing the plurality of tables $T'_i$, $0 \leq i \leq m$, using the Abelian group operator, such that the tables O and C are compensated through the composition.

According to the invention at least one of the original tables is obfuscated through an Abelian composition with a chosen table O. In this way it is more difficult to obtain the content of the original table. The fact that the cryptographic function F can be implemented as an Abelian composition of tables is used to compensate for the disturbance caused by the table O. To this end, a table C that is the inverse of table O under the Abelian operator is also included in the new composition of the tables, canceling out the effect of O. Preferably all of the original tables are obfuscated. The compensation table(s) may be included in one or more of the tables $T'_i$, $0 \leq i \leq n$ or in an additional table $T'_{n+1}$.

According to a measure of the dependent claim 2, the tables O and C represent a same non-trivial constant $b_1$; the step of creating the obfuscated table $T'_{o_1}$, $0 \leq o_1 \leq n$, includes using the Abelian group operator to combine the constant $b_1$ with each element of the corresponding table $T_{o_1}$; and the step of creating the compensating table $T'_{c_1}$, $0 \leq c_1 \leq m$, $c_1 \neq o_1$ includes using the Abelian group operator to combine the constant $b_i$ with each element of the corresponding table $T_{c_1}$. Using a constant is a simple way to hide the table $T_{o_1}$. The constant is combined with the table values and thus has the same range (for example, a typical range of $0 \ldots 2^{64-1}$ can be represented by 64-bits, giving a 64-bit constant). The constant can be seen as a key for obfuscating the table. By obfuscating several of the tables, preferably each using a respective constant, an even more secure system can be built.

According to a measure of the dependent claim 3, m=n. In this approach the number of tables used for the obfuscated cryptographic function F' is the same as used for F. No additional compensation table(s) are required.

According to a measure of the dependent claim 4, a further table $O_2$ is chosen and a further table $C_2$ such that $C_2[x] \otimes O_2[x]=0$, $\forall x \in D_1$; $O_2$ being distinct from O; and at least one further obfuscated table $T'_{o_2}$, $0 \leq o_2 \leq n$, $o_1 \neq o_2$ is formed through a composition using the Abelian group operator of the corresponding table $T_{o_1}$ and the table $O_2$ (for example, $T'_{o_2}[x]=O_2[x] \otimes T_{o_2}[x]$, $\forall x \in D_{o_2}$) and the compensating table $T'_{c_1}$ is formed through a composition that also includes the table $C_2$ (for example, $T_{c_1}[x]=C_2[x] \otimes C[x] \otimes T_{c_1}[x]$, $\forall x \in D_{c_1}$). Using constants makes it simple to compensate for multiple distinct obfuscations in only one compensating table. By including more than one compensation in this compensating table, the individual compensations are hidden better, improving security.

According to the measure of the dependent claim 5, m=n+1 and $c_1$=m implying that the compensation table is an additional table. This additional table may represent one or more of the obfuscation tables. Using an additional table gives additional freedom, resulting in further possibilities for the obfuscation that can now be compensated for.

According to the measure of the dependent claim 6, the obfuscated table $T'_{o_1}$ is applied the domain part $D_{o_1}$; O being a mapping table applied to $D_{o_1}$, $C[x] \otimes O[x]=0$, $\forall x \in D_{o_1}$. The method includes extending the domain D to D'=(D'_0, \ldots, D'_n, D'_{n+1}$), where $D_i=D_i'$ for i<=n and $D_{n+1}$ includes a representation of $D_{o_1}$ such that the composition that forms the compensating table $T'_{c_1}$ includes $C[x]$, $x \in D_{o_1}$. By extending the domain and ensuring that the domain extension includes the obfuscated part, it is now also possible to obfuscate the range of the tables since that can now be compensated due to the fact that the undisturbed domain part is still available and can be used as input for the compensation. In principle, each disturbed domain part could be included as a separate extended domain part.

According to the measure of the dependent claim 7, advantageously O is a homomorphism and the method includes forming a plurality of obfuscated tables $T'_i$ through a composition, using the Abelian group operator, of the corresponding table $T_i$ and the table O (for example, $T'_i[x]=O[x] \otimes T_i[x]$, $x \in D_i$) and forming the domain extension $D'_{n+1}$ through a composition using the Abelian operator of the corresponding subdomains of the involved tables $T_i$ (for example, $D'_{n+1}[x]=D_{o_1}[x] \otimes D_{o_2}[x] \otimes D_{o_3}[x]$, $\forall x$). The fact that O is a homomorphism enables the combined input represented in only one domain extension part $D'_{n+1}$ to have a compensating effect on the respective obfuscated tables. Thus even if several original tables are obfuscated using the homomorphism, nevertheless only one extended domain part is required and not several. This increases security and reduces the amount of data involved.

These and other aspects of the invention are apparent from and will be elucidated with reference to the embodiments described hereinafter.

DETAILED DESCRIPTION OF THE PREFERRED EMBODIMENT

Figure 1:
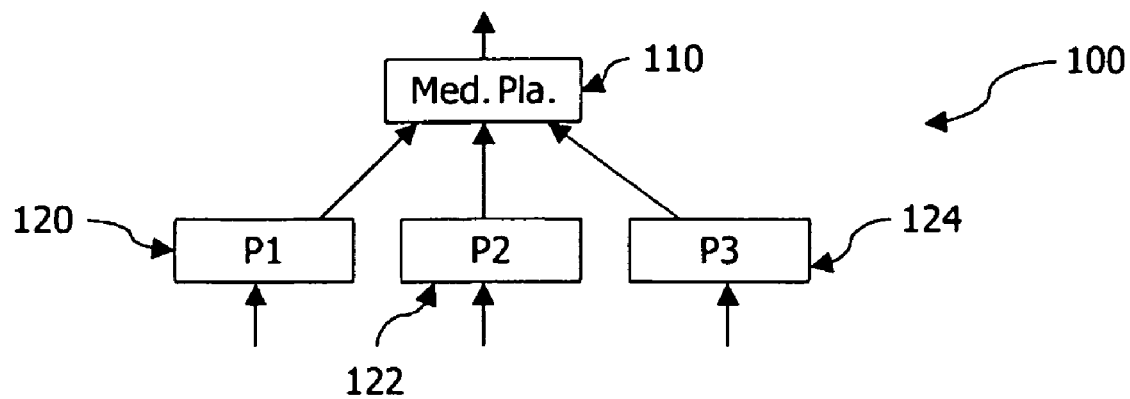
FIG. 1 shows a block diagram of a system in which the invention may be used.
Figure 2:
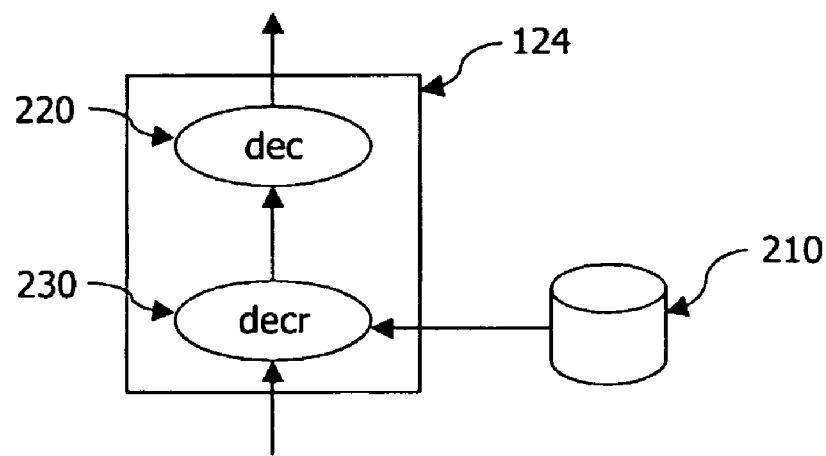
FIG. 2 shows an exemplary structure of a prior art execution device.

Digital content on the PC is typically rendered using media players, such as Microsoft's Media Player, Real's RealOne Player, Apple's QuickTime or iTunes player. Such players can load for a specific content format a respective plug-in for performing the format-specific decoding. Those content formats may include AVI, DV, Motion JPEG, MPEG-1, MPEG-2, MPEG-4 (AAC), WMV, Audio CD, MP3, WMA, WAV, AIFF/AIFC, AU, etc. The player and plug-in structure is illustrated in FIG. 1, where a media player 100 includes a core player 100 and several format-specific plug-ins (shown are plug-ins 120, 122 and 124). The core player 100 may, for example, provide the user interface for controlling the player. Each plug-in includes a respective decoder. It may send the decoded content directly to rendering HW/SW, such as a sound-card, or pass it on to the core player 100 for further processing. For secure rendering, a secure plug-in is used that not only decodes the content in the specific format but also decrypts the content. This is illustrated in FIG. 2, where the encrypted content is first fed through a decryptor 230 and next the decrypted content is fed through the format-specific decoder 220. The decryptor 230 may receive a decryption key/license from a license database 210.

The largest vulnerability of digital rights management relying on encryption is the key distribution and handling. For playback, a software player has to retrieve a decryption key from the license database, it then has to store this decryption key somewhere in memory for the decryption of the encrypted content. Typically digital rights management systems use an encryption technique based on block ciphers that process the data stream in blocks using a sequence of encryption/decryption steps, referred to as rounds. The output of $i-1^{th}$ round is the input of the $i^{th}$ round. Thus, for a system with N rounds the algorithm can be described as a function cascade $f_N \circ \ldots \circ f_1(x)$, where function $f_i$ represents the functionality of round i. Most block algorithms are Feistel networks. In such networks, the input data block x of even length n is divided in two halves of length n/2, usually referred to as L and R. So, the input x fed to the first round is given as $x=\langle L_0, R_0 \rangle$. The $i^{th}$ round (i>0) performs the function $f_i$, where $f_i$ is defined as $$f_i(\langle L_{i-1}, R_{i-1} \rangle) = \langle R_{i-1}, (L_{i-1} \oplus F(R_{i-1}, K_i)) \rangle,$$

$K_i$ is a subkey used in the $i^{th}$ round and F is an arbitrary round function.

The input and output for an encryption/decryption algorithm usually consists of a sequence of a predetermined number of N bits (digits with values of 0 or 1). These sequences will be referred to as blocks and the number of bits they contain will be referred to as their length. The bits within such sequences may be numbered starting at zero and ending at one less than the sequence length (block length or key length). For example, the AES/Rijndael system uses 128-bit blocks (N=128). The number i attached to a bit is known as its index and will be in the ranges $0 \leq i < N$ for an N-bit block.

Typically, the basic unit for processing in en encryption/decryption algorithm is a smaller than the block length. Commonly used unit lengths are 4-bit (a 4-bit unit is normally referred to as a nibble) or 8-bit (normally referred to as a byte). Those unit lengths can be processed more easily on conventional processors. If so desired also other unit lengths may be used. A unit (a contiguous sequence of a plurality of n-bits) is treated as a single entity. The input to the algorithm is processed as an array of such units that is formed by dividing these sequences into k groups of n contiguous bits to form arrays of units, where $$k*n=N.$$

For an input denoted by x, the units in the resulting array will be referenced as $x_i$, where i will be in the following range: $0 \leq i < k$. The i-th nibble can be described as:

$$x_i = \text{nibble}(i,x) = (x/2^{4i}) \bmod 2^4$$

Similarly, the i-th byte can be described as:

$$x_i = \text{byte}(i,x) = (x/2^{8i}) \bmod 2^8$$

All unit values will be presented as the concatenation of its individual bit values (0 or 1) between braces in the order $\{b_{n-1}, b_{n-2}, \ldots, b_1, b_0\}$. For most ciphers, these units are interpreted as finite field elements using a polynomial representation:

$$\sum_{j=0}^{n-1} b_j x^j.$$

In this notation, the factor x is used only to comply with a customary notation of such polynomial representation and does not represent the input. Frequently, encryption/decryption algorithms use Galois Fields as finite fields (for example $GF(2^n)$). In the polynomial representation, for an 8-bit unit $\{01100011\}$ identifies the specific finite field element $x^6+x^5+x+1$. Usually, the unit value is also indicated in a hexadecimal notation, for example the element $\{01100011\}$ can be represented as $\{63\}$. Since the encryption/decryption algorithm itself is not subject of the invention, this will not be described here in more detail.

In many existing en- and decryption algorithms, like AES (Rijndael) and Feistel ciphers, a round function F is typically constructed using tables ($T_i[x]$) for the different units of the input (i.e. different parts of the domain of the function). A role of such a table may be to perform a non-linear substitution; such tables are also referred to as S-boxes. In addition to such an S-box role, the table may also represent pre-processing and/or post-processing with respect to such an S-box. In general, the table maps n input bits to m output bits. Such a table is referred to as an n*m table. DES uses eight different 6*4 S-boxes. Some systems (e.g. Khufu and Khafre) use a single 8*32 bit S-box, IDEA effectively has a 16*16 S-box and AES/Rijndael uses an 8*8 S-box.

The composition of the output of these often-small tables is done with an Abelian group operator $\otimes$ on the ranges of these functions. Any Abelian group operator may be chosen. A frequently used operator is the bit-wise XOR operator. The system according to the invention uses this Abelian composition to hide the actual values of the tables without changing the functional behavior of F. According to the invention, at least one of the tables is obfuscated. This table will be referred to as obfuscated table. The other tables may also be obfuscated or kept unmodified. Thus, a plurality of tables $T'_i$, $0 \leq i \leq n$ are created, where for each table $T'_i$ represents the respective corresponding table $T_i$ in a modified or unmodified form. As described at least one of those created tables is an obfuscated version of a corresponding original table. First a description is given wherein only one table is directly obfuscated. This table is referred to as $T'_{o_1}$, $0 \leq o_1 \leq n$. According to the invention this obfuscated table is formed through a composition, using the Abelian group operator, of the corresponding table $T'_{o_1}$ and a table O. A straightforward composition is $T'_{o_1} = O \otimes T_{o_1}$. More complex compositions (e.g. using additional tables that are also composed using the Abelian operator) are also possible. Please note that the notation $T'_{o_1} = O \otimes T_{o_1}$ is a short notation for the purpose of simplicity. A mathematically more accurate notation is $T'_{o_1}[x] = O[x] \otimes T_{o_1}[x]$ for x in the relevant domain to which it is applied. The short notation will be used in several places in the description and a skilled person will with above explanation understand the meaning. The table O may be chosen in any suitable way. Some preferred choices will be described below. The system and method according to the invention use the Abelian composition in such a way that an obfuscation of one or more of the tables is compensated for in the Abelian composition of the tables created tables $T'_i$. At least one of those tables $T'_i$ thus compensates (in the Abelian composition) for the obfuscating caused by table O. In this way the Abelian composition of the tables $T'_i$ thus still performs the function F, although some or all of the tables differ from the original tables $T_i$. The table that compensates for O will be indicated as $T'_{c_1}$, $0 \leq c_1 \leq m$, $c_1 \neq o_1$, and referred to as compensating table. This table is formed through a composition, using the Abelian group operator, that includes a table C. A straightforward composition is $T'_{c_1} = C \otimes T_{c_1}$. The table C is chosen such that $C \otimes O = 0$ (thus C is the inverse of O under the Abelian operator, also denoted as $C = O^{-1}$). Depending on the choice for the disturbance O, the compensating table may be one of the tables $T'_i$ described above, or an additional table may be used. Thus, either n or n+1 tables are created: $T'_i$, $0 \leq i \leq m$; $n \leq m \leq n+1$. It will be appreciated that preferably all original tables are changed. In the system and method according to the invention, an obfuscated function F' is formed that is functionally equivalent to the cryptographic function F by composing the plurality of tables $T'_i$, $0 \leq i \leq m$, using the Abelian group operator, where the composition is such that the tables O and C compensate each other through the composition. It will be understood that instead of regarding table O as the table causing the obfuscating and C causing the compensation, these roles can equally well be seen as reverse.

The invention will be illustrated for a function $F:F:0 \ldots 2^{64-1} \to 0 \ldots 2^{64-1}$. The function F may be a round function of a block cipher, such as a Feistel cipher. In the example, function F can be represented as an Abelian composition of sixteen table-implemented functions, each with a respective nibble as input:

$$F(x) = T_0[\text{nibble}(0,x)] \otimes \ldots \otimes T_{15}[\text{nibble}(15,x)]$$

This can also be written as:

$$F(x) = \prod_{i=0}^{15} \otimes T_i[\text{nibble}(i,x)] = \prod_{i=0}^{15} \otimes T_i[x_i],$$

and $$T_i[x_i]: 0 \ldots 15 \to 0 \ldots 2^{64-1}, \forall i: i \in 0 \ldots 15$$

It will be appreciated that the range $(0 \ldots 2^{64-1})$ and the unit length (in this example a 4-bit nibble) are a mere choice for the purpose of the example. Other choices may also be made.

Two preferred approaches for the obfuscating of the tables according to the invention are described in more detail below. In the first approach the domain on which the obfuscated tables work is the same as used for the original tables. In a preferred embodiment, constants are used for the obfuscating. In the second approach the domain is extended. In preferred approach a homomorphism that depends on the input x is used for the obfuscation and compensation.

No Domain Extension, Using Constants

In this approach, the tables O and C represent a same non-trivial constant $b_0$. The obfuscated table $T'_{o_1}$, $0 \leq o_1 \leq n$, is created by using the Abelian group operator to combine the constant $b_1$ with each element of the corresponding table $T_{o_1}$. Similarly, the compensating table $T'_{c_1}$, $0 \leq c_1 \leq m$, $c_1 \neq o_1$ is created by using the Abelian group operator to combine the constant $b_0$ with each element of the corresponding table $T_{c_1}$. It can be observed that in this scenario, two identical tables are used. As will also be clear from the example given below, this can be generalized to the situation wherein an even number of the original tables $T_i$ are combined with a same constant using the Abelian composition. The constant is combined with the table values and thus has the same range (in the example, $0 \ldots 2^{64-1}$) and is represented by the same number of bits (in the example, 64 bits). By combining an even number of tables with the same constant, the Abelian composition results in an automatic elimination of the disturbance when the obfuscated tables are combined. This is illustrated for a simple example wherein only the first table ($o_1=0$) and second table ($c_1=1$) are modified through combination with the same constant $b_0$ and the other tables are not modified, giving:

$T'_0[x_0] = b_0 \otimes T_0[x_0]$, $T'_1[x_1] = b_0 \otimes T_1[x_1]$, $T'_i[x_i] = T_i[x_i], \forall i: i \in 2 \ldots 15$ The created tables $T'_i \forall i: i \in 0 \ldots 15$ of which some are modified (obfuscated) can be used in the new function F' (obfuscated F):

$$F'(x) = \prod_{i=0}^{15} \otimes T'_i[x_i]$$

It can be observed that the tables O and C indeed are chosen such that $C \otimes O = 0$, based on the fact that $C = O$ and that for an Abelian composition holds that $O \otimes O = 0$. As a consequence, also the functions F' and F are functionally equal.

Proof: $F'(x) = \prod_{i=0}^{15} \otimes T_i[x_i]$

[by definition of $T_i$]

$F'(x) = b_0 \otimes T_0[x_0] \otimes b_0 \otimes T_1[x_1] \otimes \prod_{i=2}^{15} \otimes T_i[x_i]$ $[a \otimes b = b \otimes a, a \otimes (b \otimes c) = (a \otimes b) \otimes c]$ -continued $F'(x) = b_0 \otimes b_0 \otimes T_0[x_0] \otimes T_1[x_1] \otimes \prod_{i=2}^{15} \otimes T_i[x_i]$ $[a \otimes a = 0]$ $F'(x) = T_0[x_0] \otimes T_1[x_1] \otimes \prod_{i=2}^{15} \otimes T_i[x_i] = \prod_{i=0}^{15} \otimes T_i[x_i] = F(x)$ It will be clear that this holds indeed for any obfuscation where the same constant is combined with an even number of tables using the Abelian group operator. So, the constant may be combined with 2, 4, 6, etc. number of tables. In the example, a total of 16 tables are used. So, it is possible to obfuscate all tables with just one constant. The constant in the example has 64 bits; this constant can be seen as a 64 bit key.

This embodiment will be illustrated further with two examples that for the purpose of the explanation have been simplified to the extent that no domain parts are used, instead each table operates on the entire domain. Only two original tables are used.

$T_0 = \{0 \mapsto 1, 1 \mapsto 2, 2 \mapsto 0\}$ $T_1 = \{0 \mapsto 0, 1 \mapsto 2, 2 \mapsto 1\}$ In these definitions of the tables $0 \mapsto 1$ means that an input value 0 is mapped to an output value 1, $1 \mapsto 2$ that 1 is mapped to 2, etc. In the examples, the tables O and C depend on the input x. The following obfuscating and compensating tables have been chosen:

$$O[x] = \{0 \mapsto 2, 1 \mapsto 1, 2 \mapsto 2\} \Rightarrow C[x] = \left\{0 \mapsto \frac{1}{2}, 1 \mapsto 1, 2 \mapsto \frac{1}{2}\right\}$$

The created tables are then $T'_0[x] = O[x] \otimes T_0[x]$, $T'_1[x] = C[x] \otimes T_1[x]$

EXAMPLE 1

$F(x) = T_0[x] \cdot T_1[x]$ (in this example, the Abelian operator $\otimes$ is a multiplication $\cdot$)

giving $T''_1 = \{0 \mapsto 2, 1 \mapsto 2, 2 \mapsto 0\}$ $T''_1 = \left\{0 \mapsto 0, 1 \mapsto 2, 2 \mapsto \frac{1}{2}\right\}$ $F'(x) = T'_0[x] \cdot T'_1[x]$

EXAMPLE 2

$F(x) = T_0[x] \otimes T_1[x]$ (the Abelian operator is the XOR operator)

$T'_0 = \{0 \mapsto 3, 1 \mapsto 0, 2 \mapsto 2\}$ $T'_1 = \{0 \mapsto 2, 1 \mapsto 0, 2 \mapsto 3\}$ $F'(x) = T'_0[x] \otimes T'_1[x]$ In a further embodiment, security is improved further by using at least one more key (i.e. more constants may be used). In the simplest form two distinct tables are combined with the constant $b_0$ as shown above and two different tables are combined with the constant $b_1$. In this way, a further table $O_2$ and a further table $C_2$ are chosen such that $C_2 \otimes O_2 = 0$, where $O_2$ is distinct from O and the tables $O_2$ and $C_2$ both represent the same non-trivial constant $b_1$. It will be appreciated that also more tables may be protected using the constant $b_1$. For example, it is then also possible to combine half of the tables with $b_0$ and half of the tables $b_1$. In this way, all tables are obfuscated and each constant is used an even number of times, resulting in the constant being eliminated in the composition. If so desired, some tables may be used in plain form (i.e. not obfuscated through an Abelian group operator).

In a further embodiment, the same tables $O_2$ and $C_2$ may be used. Table $O_2$ may be used as described above to obfuscate at least one further table $T_{o_2}$, $0 \leq o_2 \leq n$, $o_1 \neq o_2$ forming at least one further obfuscated table $T'_{o_2}$ through a composition using the Abelian group operator of the corresponding table $T_{o_2}$ and the table $O_2$ (for example, $T'_{o_2} = O_2 \otimes T_{o_2}$). Instead of using $C_2$ to form a further compensating table, instead the existing compensating table $T'_{c_1}$ is used to also compensate for $O_2$. This is achieved by including in the composition for $T'_{c_1}$ also the further compensating table $C_2$ (for example, $T'_{c_1} = C_2 \otimes C \otimes T_{c_1}$). This latter embodiment can be extended by including more than two compensations in $T'_{c_1}$. In a preferred embodiment, all, but one, of the original tables $T_i$ are obfuscated with a respective constant and the one remaining table is obfuscated with the Abelian composition of all constants. In this embodiment, all constants are used twice (i.e. an even number) and all tables are obfuscated. In the following example, the first fifteen tables (i=0 ... 14) are combined with a respective constant $b_i$ and the last table is combined with all constants, giving:

$$T'_i[x_i] = b_i \otimes T_i[x_i] \forall i : i \in 0 \ldots 14 \forall x_i : x_i \in 0 \ldots 15$$

and $$T'_{15}[x_{15}] = b_0 \otimes \ldots \otimes b_{14} \otimes T_{15}[x_{15}] \forall x_i : x_i \in 0 \ldots 15$$

The obfuscated tables $T'_i \forall i : i \in 0 \ldots 15$ are used in a new function F' (obfuscated F):

$$F'(x) = \prod_{i=0}^{15} \bigotimes T'_i[x_i]$$

As before, the functions F' and F are functionally equal.

Proof:

$$F'(x) = \prod_{i=0}^{15} \bigotimes T'_i[x_i]$$

[by definition of $T_{15}$]

$$F'(x) = (b_0 \otimes \ldots \otimes b_{14}) \otimes T_{15}[x_{15}] \otimes \prod_{i=0}^{14} \bigotimes b_i \otimes T_i[x_i]$$

$[a \otimes b = b \otimes a, a \otimes (b \otimes c) = (a \otimes b) \otimes c]$ $$F'(x) = (b_0 \otimes \ldots \otimes b_{14}) \otimes (b_0 \otimes \ldots \otimes b_{14}) \otimes \prod_{i=0}^{15} \bigotimes T_i[x_i]$$

$[a \otimes a = 0]$ $$F'(x) = 0 \otimes \prod_{i=0}^{15} \bigotimes T_i[x_i]$$

$[a \otimes 0 = 0 \otimes a = a]$ $$F'(x) = \prod_{i=0}^{15} \bigotimes T_i[x_i]$$

[by definition of $F$]

$$F'(x) = F(x)$$

From above examples it will be clear that the skilled person has freedom in the level of obfuscating to be achieved. For a system where F is an Abelian composition of n tables, one to n constants may be used. Each constant is combined with an even number of tables. It will be appreciated that in principle any number of constants may be used. However, by associating every table with its own constant, using more than n constants will not increase security any further. Preferably, the constants are chosen 'randomly' using a suitable random or pseudo-random generator.

In the examples given above, the compensation C is combined with one or more of the original tables. Thus normally the number m of created tables T' will be the same as the number n of original tables T. An alternative is to use one additional table for the compensation, thus m=n+1. In this embodiment, again all constants are used twice (i.e. an even number) giving an automatic compensation through the Abelian composition. In the following example, all sixteen original tables (i=0 ... 15) are combined with a respective constant $b_i$ and one additional table is created that is the combination of all constants, giving:

$$T'_i[x_i] = b_i \otimes T_i[x_i] \forall i : i \in 0 \ldots 15 \forall x_i : x_i \in 0 \ldots 15$$

and $$T'_{16} = b_0 \otimes \ldots \otimes b_{14} \otimes b_{15} \forall x_i : x_i \in 0 \ldots 15$$

Domain Extension

In above approach, combining an original table T with a constant b means that every entry in the table T is combined with the same value b using the Abelian group operator $\otimes$ In the second approach, the obfuscation depends at least partly on the input to the table. In order to be able to compensate for this, the compensation table needs access to the input. To this end, the domain is extended. As described above, the original tables $T_i (0 \leq i \leq n; n \geq 1)$, each operate on a respective part $D_i$ of the domain D. At least one of the created $T'_{o_1}$, $0 \leq o_1 \leq n$, the obfuscated table, is formed through a composition, using the Abelian group operator, of the corresponding table $T_i$ and the table O (for example, $T'_{o_1} = O \otimes T_{o_1}$). As a consequence, the obfuscated table $T'_{o_1}$ is applied to the domain part $D_{o_1}$ and O is a mapping table that is applied to $D_{o_1}$. As described above, at least one of the other tables $T'_{c_1}$, $0 \leq c_1 \leq m$, $c_1 \neq o_1$, the compensating table, is formed through a composition, using the Abelian group operator, that includes the table C (for example, $T'_{c_1} = C \otimes T_{c_1}$). For this to work it is required that $C[x] \otimes O[x] = 0$, $\forall x \in D_{o_1}$. To this end, the domain D is extended to $D' = (D_0', \ldots, D_n', D_{n+1}')$, where $D_i = D_i'$ for $i <= n$ and $D_{n+1}$ includes a representation of $D_{o_1}$ such that the composition that forms the compensating table $T'_{c_1}$ includes $C[x]$, $x \in D_{o_1}$.

According to the invention at least one table is obfuscated through a combination with a table O that at least partly depends on the same input; the combination being performed by the Abelian group operator. For example, the first table $T_0$ is obfuscated:

$$T''_0[x_0]=O(x_0)\otimes T_0[x_0]$$

Keeping all other tables unmodified:

$$T''_i[x_i]=T_i[x_i], \forall i:i\in 1\ldots 15$$

would not give a compensation for $O(x_0)$. According to the invention, the compensation is achieved by using at least one additional table that covers the terms that need to be compensated with respect to the Abelian group operator. In the example given above, the additional table could simply be:

$$T''_{16}[x_{16}]=O(x_0)$$

A new function F'' (obfuscated F) could then be defined as:

$$F''(x'')=\prod_{i=0}^{16}\otimes T''_i[x''_i]$$

It can be observed that the domain of F'' is extended compared to the domain of F to supply input for the additional table. In the example, the domain of the F'' is now $0\ldots 2^{(64+4)-1}$. For this example, the extended domain, indicated as $E(x)$, can be defined as:

$$E(x)=(x_0'',x_1',\ldots,x_{14}'',x_{15}'',x_{16}'')=(x_0,x_1,\ldots,x_{14},x_{15},x_0)$$

Using these definitions, F'' is functionally equivalent to F:

$$F''(x'')=\prod_{i=0}^{16}\otimes T''_i[x''_i]=$$

$$O(x_0)\otimes T_0[x_0]\otimes\prod_{i=1}^{15}\otimes T_i[x_i]\otimes O(x_0)=\prod_{i=0}^{15}\otimes T_i[x_i]=F(x)$$

In this simple example, where only table $T_0$ is obfuscated, it is relatively simple for an attacker to break the obfuscation, since the table $O(x_0)$ that is used for the obfuscation is available in plain text form. One way to overcome this would be to use the first approach and to combine $O(x_0)$ with a constant and use the constant also to obfuscate an odd number of other tables. A preferred way to hide $O(x_0)$ is to hide several of the original tables $T_i$ by a respective table $O_i(x_i)$ and use the plurality of O-tables to hide one another. It should be noted that the respective mapping used for $O_i$ may but need not be the same.

This approach will be illustrated using the following example. In this example, the first table $T_0$ is obfuscated as follows:

$$T''_0[x_0]=O_o(x_0)\otimes T_0[x_0]$$

The second table is obfuscated by:

$$T''_1[x_1]=O_1(x_1)\otimes T_1[x_1]$$

Keeping all the other tables unmodified:

$$T''_i[x_i]=T_i[x_i], \forall i:i\in 2\ldots 15$$

The new table can now be defined as:

$$T''_{16}[x_{16}]=O_0(x_0)\otimes O_1(x_1)$$

Now this seventeenth table no longer reveals one of the tables used for the hiding. It will be observed that this last table now needs two domain parts as input, giving a double extension of the domain. It will be understood that this increases the data rate and reveals part of the operation of the system.

In a preferred embodiment, O is a non-trivial homomorphism and the method includes forming a plurality of obfuscated tables $T'_i$ through a composition, using the Abelian group operator, of the corresponding table $T_i$ and the table O example, $T'_{o_1}[x]=O[x]\otimes T_{o_1}[x]$, $x\in D_{o_1}$) and forming the domain extension $D'_{n+1}$ through a composition using the Abelian operator of the corresponding subdomains of the involved tables $T_i$ (for example, $D'_{n+1}=D_{o_1}\otimes D_{o_2}\otimes D_{o_3}$). In the example below, the non-trivial homomorphism will be referred to as $H(x)$. Any such homomorphism may be chosen. The mathematical definition of group homomorphism is as follows. Let $G_1$ and $G_2$ be groups with the operations $O_1$ and $O_2$, respectively. A mapping M from $G_1$ to $G_2$ is a homomorphism if $M(O_1(x,y))=O_2(M(x),M(y))$ for all x,y in $G_1$. In the example given below, $H(x)$ is a linear mapping on $GF(2^4)$ to $GF(2^{64})$. Applying this approach to the same example as given above, the following is obtained:

$$T''_0[x_0]=H(x_0)\otimes T_0[x_0]$$

The second table is obfuscated by:

$$T''_1[x_1]=H(x_1)\otimes T_1[x_1]$$

Keeping all the other tables unmodified:

$$T''_i[x_i]=T_i[x_i], \forall i:i\in 2\ldots 15$$

The new table can now be defined as:

$$T''_{16}[x_{16}]=H(x_0)\otimes H(x_1)$$

Using the homomorphism, the extended domain can now be $E(x)=(x_0,x_1,\ldots,x_{14},x_{15},x_0\otimes x_1)$. Only one additional domain part is used, representing multiple parts. Compared to the previous approach this reduces the data rate and increases security.

It will be appreciated that in such a way each of the tables $T[x_i]$ can be obfuscated by a respective $H(x_i)$. How many tables are obfuscated is a choice that can be made by the skilled person depending on the security requirements.

Preferably all tables are hidden. For the exemplary system, this would give:

$$T''_i[x_i]=H(x_i)\otimes T_i[x_i]\forall i:i\in 0\ldots 15\forall x_i:x_i\in 0\ldots 15$$

and $$T''_{16}[x_{16}]=H(x_{16})\forall x_{16}:x_{16}\in 0\ldots 15$$

Let $$F''(x'')=\prod_{i=0}^{16}\otimes T''_i[x''_i]$$

The extended domain $E(x)$ is given by:

$$E(x)=(x_0'',x_1'',\ldots,x_{14}'',x_{15}'',x_{16}''), \text{ where}$$

$$x_i''=x_i, \text{ for } i=0\ldots 15$$

and $$x_{16}''=\prod_{i=0}^{15}\otimes x_i$$

The functions F'''∘E, and F are functionally equal.

Proof:

$$(F'' \circ E)(x) = \prod_{i=0}^{16} \bigotimes T_i''[\text{nibble}(i, E(x))]$$

[by definition of $T''$]

$(F'' \circ E)(x) =$ $$H(\text{nibble}(16, E(x))) \otimes \prod_{i=0}^{15} \bigotimes (H(\text{nibble}(i, E(x))) \otimes T_i[\text{nibble}(i, E(x))])$$

[$a \otimes b = b \otimes a, a \otimes (b \otimes c) = (a \otimes b) \otimes c$]

$(F'' \circ E)(x) = H(\text{nibble}(16, E(x))) \otimes$ $$\prod_{i=0}^{15} \bigotimes H(\text{nibble}(i, E(x))) \otimes \prod_{i=0}^{15} \bigotimes T_i[\text{nibble}(i, E(x))]$$

[by the definition of $E$]

$$(F'' \circ E)(x) = H\left(\prod_{i=0}^{15} \bigotimes x_i\right) \otimes \left(\prod_{i=0}^{15} \bigotimes H(x_i)\right) \otimes \prod_{i=0}^{15} \bigotimes T_i[x_i]$$

[by the definition of $F$]

$$(F'' \circ E)(x) = F(x) \otimes H\left(\prod_{i=0}^{15} \bigotimes x_i\right) \otimes \left(\prod_{i=0}^{15} \bigotimes H(x_i)\right)$$

[homomorphism]

$$(F'' \circ E)(x) = F(x) \otimes H\left(\prod_{i=0}^{15} \bigotimes x_i\right) \otimes H\left(\prod_{i=0}^{15} \bigotimes x_i\right)$$

[$a \otimes a = 0$]

$(F'' \circ E)(x) = F(x) \otimes 0$

[$a \otimes 0 = 0 \otimes a = a$]

$(F'' \circ E)(x) = F(x)$

[]

It will be appreciated that, although all examples show for the purpose of explanation that the extension is the last part of the extended domain, in fact the extension may be anywhere, i.e. the tables and the respective domain parts may be mixed.

In itself, extension of the domain might be observed and used to attack the obfuscated tables. Any suitable technique may be used to hide details of the extension. Many ciphers, like Rijndael/AES or Feistel ciphers, use a sequence of round functions (usually the same round function made specific using a round-specific key) can be modeled as function cascade: $FC=F_N \circ \ldots \circ F_1 \circ F_0$, where $F_i$ is the round function of round i.

In such a system, the domain extension (i.e. the part that has been extended) can be hidden in the following way:

Consider a function cascade of $F_j \forall_j: j \in 1 \ldots N$ like:

$FC = F_N \circ \ldots \circ F_1 \circ F_0$ $FC = (F''_N \circ E_n) \circ \ldots \circ (F''_1 \circ E_1) \circ F_0$ $FC = F''_N \circ (E_N \circ F''_{N-1}) \circ \ldots \circ (E_1 \circ F_0)$ The $E_i \circ F''_{i-1} \forall i: 1 \ldots N-1$ can be computed upfront, turning every $T_{j,i}[x]$ of $F_j$ in a mapping $0 \ldots 15 \rightarrow 0 \ldots 2^{(=+4)-1}$ (hiding the domain extension function by composition).

In a preferred embodiment, approach 1 and 2 are combined. Thus some, and preferably all, tables T" are combined with a respective constant. In this way, also the table with the domain extension (in the example $T_{16}$) can be hidden. An advantage of combining $T_{16}$ with a hiding constant is that the fact that H(x) is a homomorphism is hidden, since the property H(0)=0, which hold for every homomorphism with ⊗ is lost.

Figure 3:
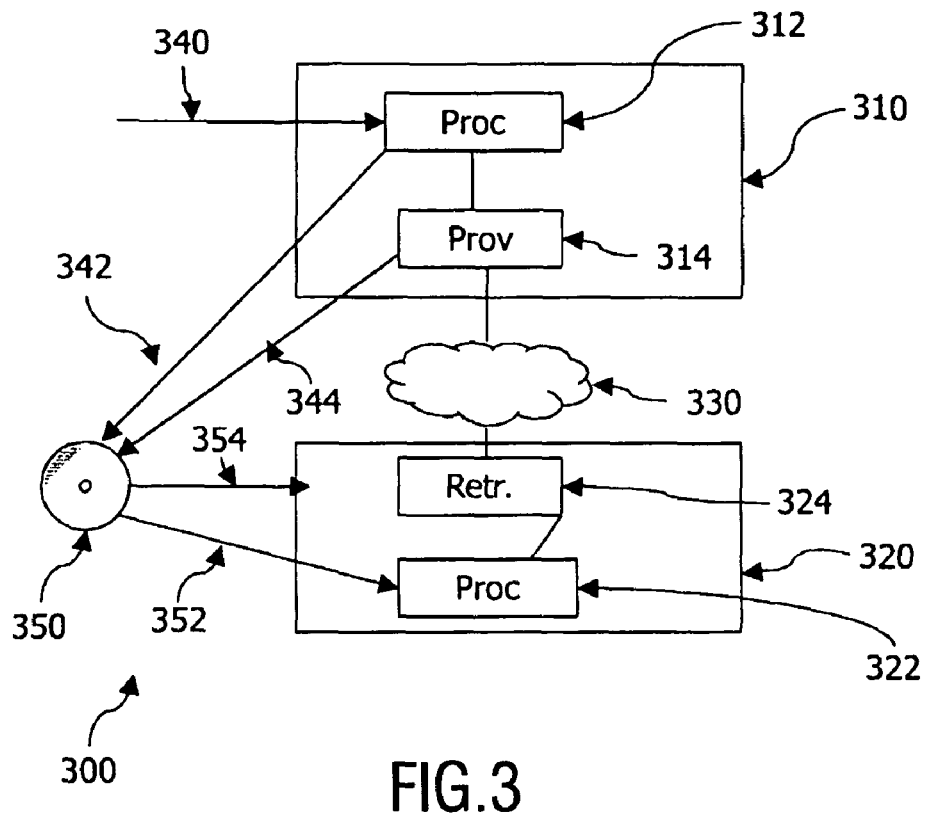
FIG. 3 shows a block diagram of a system according to the invention.

FIG. 3 illustrates a system in which the invention may be employed. The system 300 includes a server 310 and at least one executing device 320. The server 310 provides a cryptographic function F to the execution device 320 in an obfuscated form. The function F cryptographically converts an input x from a predetermined domain D to an output y using a plurality of non-linear mapping tables $T_i(0 \leq i \leq n; n \geq 1)$, each with key-like information and operating on a respective part $D_i$ of the domain D. The function F composes output of the mapping tables using an Abelian group operator ⊗ (for example, $F(x)=T_0[x_0] \otimes \ldots \otimes T_n[x_n]$, $x=(x_0, x_1, \ldots, x_n)$, $x_i \in D_i$). The server may be implemented on a conventional computer platform, for example on a platform used as a server, such as a web server, or file server. The server includes a processor 312. The processor 312 is operated under control of a program. The program may be permanently embedded in the processor in an embedded storage, like embedded ROM, but may also be loaded from a background storage, such as a hard disk (not shown). Under control of the program, the processor 312:

chooses a table O and a table C such that C⊗O=0;

creates a plurality of tables $T'_i, 0 \leq i \leq m; n \leq m \leq n+1$, where for $0 \leq i \leq n$, each table $T'_i$ represents the respective corresponding table $T_i$ and at least one of those tables $T'_{o_1}$, $0 \leq o_1 \leq n$, the obfuscated table, being formed through a composition, using the Abelian group operator, of the corresponding table $T_i$ and the table O (for example, $T'_{o_1}=O \otimes T_{o_1}$), and at least one of the other tables $T'_{c_1}, 0 \leq c_1 \leq m, c_1 \neq o_1$, the compensating table, being formed through a composition, using the Abelian group operator, that includes the table C (for example, $T'_{c_1}=C \otimes T_{c_1}$).

Additionally, the server includes means 314 for providing the plurality of tables $T'_i, 0 \leq i \leq m; n \leq m \leq n+1$, to the executing device. The server may do this in any suitable form. For example, in a factory the tables may be stored in a storage module of the executing device during the manufacturing of the executing device 320. FIG. 3 shows that the tables are downloaded through the Internet 330 directly to the executing device 320.

The executing device 320 includes means 324 for receiving the plurality of tables $T'_i, 0 \leq i \leq m; n \leq m \leq n+i$, from the server 310. These means 324 cooperate with the means 314 of the server and will not be described further. The executing device 320 further includes a processor 322. The processor may be of any suitable type, such as a processor known from personal computers or an embedded microcontroller. The processor 322 is operated under control of a program. The program may be permanently embedded in the processor 322 using an embedded storage, like embedded ROM, but may also be loaded from a background storage, such as a hard disk (not shown). Under control of the program, the processor 322 forms a function F' that is functionally equivalent to the cryptographic function F by composing the plurality of tables $T'_i, 0 \leq i \leq m$, using the Abelian group operator, such that the tables 0 and C are compensated through the composition. In the example of FIG. 3, the executing device 320 includes means 324 for retrieving the tables, for example, through the Internet 330 or from a storage medium 350. Similarly, the executing device 320 may retrieve encrypted content 352 from the medium 350, and decrypt this using the processor 322. The processor may also decode the decrypted content. The server 310 may have stored the encrypted content 342 in the medium 350 possibly together with the tables 344.

Figure 4:
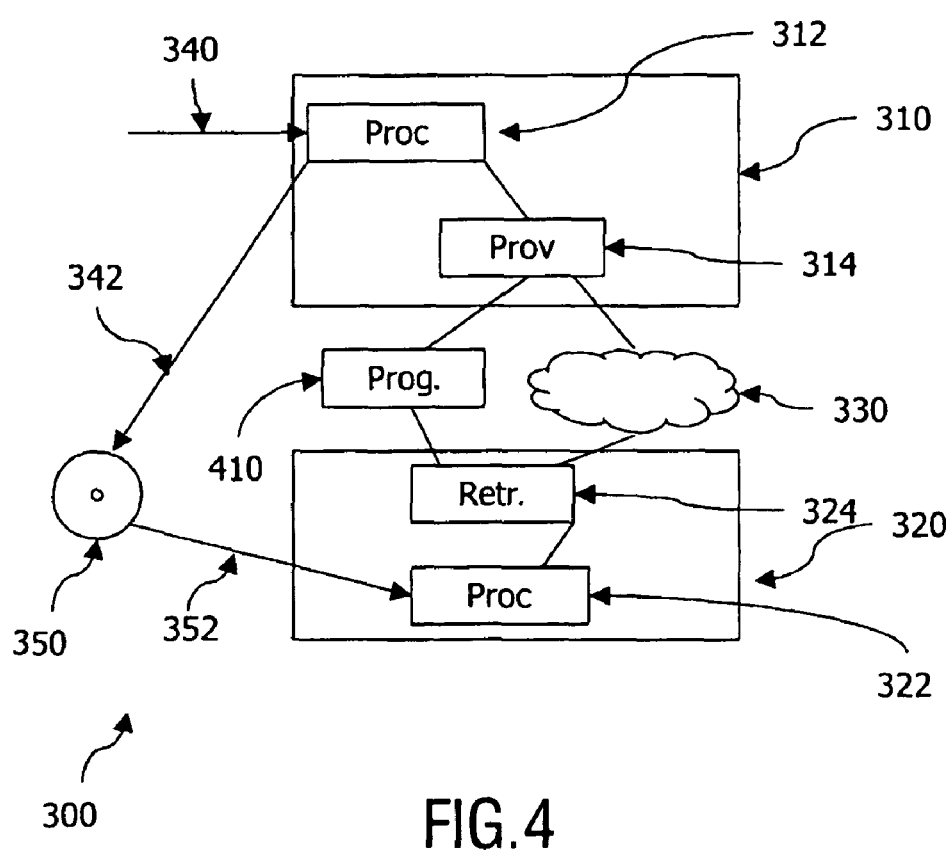
FIG. 4 shows a further embodiment of a system according to the invention.

FIG. 4 shows a preferred embodiment wherein the tables T' are provided to the executing device 320 embedded in a software program 410 for execution by the processor 322. Same numbers in FIG. 4 refers to the same items as used in FIG. 3. The software program 410 may be a plug-in for a program like a media player. Thus, the means 314 of FIG. 4 may supply this plug-in 410 via the Internet (e.g. item 330 of FIG. 4) or embed it directly into the executing device 320 during manufacturing.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. The carrier be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal that may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method of providing a cryptographic function F to an execution device in obfuscated form; the function F, when executed by a processor in the execution device, cryptographically converting an input x from a predetermined domain D to an output y, wherein y=F(x) and using a plurality of non-linear mapping tables $T_i$ ($0 \leq i \leq n$; $n \geq 0$, each with key-like information and operating on a respective part $D_i$ of the domain D, the function F composing output of the mapping tables using an Abelian group operator $\otimes$; the method including:
   choosing a table O and a table C such that $C[x] \otimes O[x]=0$, $\forall x \in D_i$;
   creating a plurality of tables $T'_i$, $0 \leq i \leq m$; $n \leq m \leq n+1$, where for $0 \leq i \leq n$, each table $T'_i$ represents the respective corresponding table $T_i$ and at least one of those tables $T'_i$, $0 \leq o_1 \leq n$, hereinafter referred to as obfuscated table, being formed through a composition, using the Abelian group operator, of the corresponding table $T_{o_1}$ and the table O, and at least one of the other tables $T'_{c_1}$, $0 \leq c_1 \leq m$, $c_1 \neq o_1$, hereinafter referred to as compensating table, being formed through a composition, using the Abelian group operator, that includes the table C;
   providing the plurality of tables $T'_i$, $0 \leq i \leq m$; $n \leq m \leq n+1$ the executing device; and
   at the executing device, forming a function F' that is functionally equivalent to the cryptographic function F by composing the plurality of tables $T'_i$, $0 \leq i \leq m$, using the Abelian group operator, such that the tables O and C are compensated through the composition.

2. A method as claimed in claim 1, wherein the tables O and C represent a same non-trivial constant $b_1$; the step of creating the obfuscated table $T'_i$, wherein $i=o_1$ and $0 \leq o_1 \leq n$, includes using the Abelian group operator to combine the constant $b_1$ with each element of the corresponding table $T_{o_1}$; and the step of creating the compensating table $T'_{c_1}$, $0 \leq c_1 \leq m$, $c_1 \neq o_1$ includes using the Abelian group operator to combine the constant $b_i$ with each element of the corresponding table $T_{c_1}$.

3. A method as claimed in claim 2, wherein m=n.

4. A method as claimed in claim 2, including:
   choosing a further table $O_2$ and a further table $C_2$ such that $C_2[x] \otimes O_2[x]=0$, $\forall x \in D_i$; $O_2$ being distinct from O, the tables $O_2$ and $C_2$ representing a same non-trivial constant $b_2$; and
   forming at least one further obfuscated table $T'_{o_2}$, $0 \leq o_2 \leq n$, $o_1 \neq o_2$ through a composition using the Abelian group operator of the corresponding table $T_{o_2}$ and the table $O_2$ and forming the compensating table $T'_{c_1}$ through a composition that also includes the table $C_2$.

5. A method as claimed in claim 1, wherein m=n+1 and $c_1$=m.

6. A method as claimed in claim 5, wherein the obfuscated table $T'_i$, wherein $i=o_1$ and $0 \leq o_1 \leq n$ is applied a domain part $D_{o_1}$; O being a mapping table being applied to $D_{o_1}$, $C[x] \otimes O[x]=0$, $\forall x \in D_{o_1}$; the method including extending the domain D to $D'=(D_o', \ldots, D_n', D_{n+1}')$, where $D_i'=D_i'$ for $i<=n$ and $D_{n+1}$ including a representation of $D_{o_1}$ such that the composition that forms the compensating table $T'_{c_1}$ includes C[x], $x \in D_{o_1}$.

7. A method as claimed in claim 6, wherein O is a homomorphism and the method includes forming a plurality of obfuscated tables $T'_i$ through a composition, using the Abelian group operator, of the corresponding table $T_i$ and the table O and forming a domain extension $D'_{n+1}$ through a composition using the Abelian operator of the corresponding subdomains of the involved tables $T_i$.

8. A system for providing a cryptographic function F to an execution device in an obfuscated form; the system including: a server and an executing device; the function F cryptographically converting an input x from a predetermined domain D to an output y, wherein y=F(x) and using a plurality of non-linear mapping tables $T_i$($0 \leq i \leq n$; $n \geq 1$), each with key-like information and operating on a respective part $D_i$ of the domain D, the function F composing output of the mapping tables using an Abelian group operator $\otimes$;
   the server including a processor for, under control of a program:
   choosing a table O and a table C such that $C[x] \otimes O[x]=0$, $\forall x \in D_i$;
   creating a plurality of tables $T'_i$, $0 \leq i \leq m$; $n \leq m \leq n+1$, where for $0 \leq i \leq n$, each table $T'_i$ represents the respective corresponding table $T_i$ and at least one of those tables $T'_i$, $0 \leq o_1 \leq n$, hereinafter referred to as obfuscated table, being formed through a composition, using the Abelian group operator, of the corresponding table $T_{o_1}$ and the table O, and at least one of the other tables $T'_{c_1}$, $0 \leq c_1 \leq m$, $c_1 \neq o_1$, hereinafter referred to as compensating table, being formed through a composition, using the Abelian group operator, that includes the table C; and means for providing the plurality of tables $T'_i$, $0 \leq i \leq m$; $n \leq m \leq n+1$, to the executing device; and the executing device including:

means for receiving the plurality of tables $T'_i$, $0 \leq i \leq m$; $n \leq m \leq n+1$, from the server; and a processor for, under control of a program, forming a function F' that is functionally equivalent to the cryptographic function F by composing the plurality of tables $T'_i$, $0 \leq i \leq m$, using the Abelian group operator, such that the tables O and C are compensated through the composition.

9. A system as claimed in claim 8, wherein the program in the server is operative to cause the processor to form the program for the execution device where the program for the execution device includes the plurality of tables $T'_i$, $0 \leq i \leq m$; $n \leq m \leq n+1$, and includes instructions for causing the processor of the execution device to form the obfuscated function F'.

10. A server for use in the system as claimed in claim 8, wherein a cryptographic function F is provided to an execution device in an obfuscated form; the function F cryptographically converting an input x from a predetermined domain D to an output y using a plurality of non-linear mapping tables $T_i$($0 \leq i \leq n$; $n \geq 0$), each with key-like information and operating on a respective part $D_i$ of the domain D, the function F composing output of the mapping tables using an Abelian group operator $\otimes$; the server including a processor for, under control of a program:

choosing a table O and a table C such that $C[x] \otimes O[x]=0$, $\forall x \in D_i$;

creating a plurality of tables $T'_i$, $0 \leq i \leq m$; $n \leq m \leq n+1$, where for $0 \leq i \leq n$, each table $T'_i$ represents the respective corresponding table $T_i$ and at least one of those tables $T'_{o_1}$, $0 \leq o_1 \leq n$, hereinafter referred to as obfuscated table, being formed through a composition, using the Abelian group operator, of the corresponding table $T_{o_1}$ and the table O, and at least one of the other tables $T'_{c_1}$, $0 \leq c_1 \leq m$, $c_1 \neq o_1$, hereinafter referred to as compensating table, being formed through a composition, using the Abelian group operator, that includes the table C; and means for providing the plurality of tables $T'_i$, $0 \leq i \leq m$; $n \leq m \leq n+1$, to the executing device.

11. A computer program product stored on a non-transitory medium for controlling a processor in a server as claimed in claim 10, wherein a cryptographic function F is provided to an execution device in an obfuscated form; the function F cryptographically converting an input x from a predetermined domain D to an output y using a plurality of non-linear mapping tables $T_i$($0 \leq i \leq n$; $n \geq 1$), each with key-like information and operating on a respective part $D_i$ of the domain D, the function F composing output of the mapping tables using an Abelian group operator $\otimes$;

the computer program product including program instructions to cause the processor to choosing a table O and a table C such that $C[x] \otimes O[x]=0$, $\forall x \in D_i$; and to create a plurality of tables $T'_i$, $0 \leq i \leq m$; $n \leq m \leq n+1$, where for $0 \leq i \leq n$, each table $T'_i$ represents the respective corresponding table $T_i$ and at least one of those tables $T'_{o_1}$, $0 \leq o_1 \leq n$, hereinafter referred to as obfuscated table, being formed through a composition, using the Abelian group operator, of the corresponding table $T'_{o_1}$ and the table O, and at least one of the other tables $T'_{c_1}$, $0 \leq c_1 \leq m$, $c_1 \neq o_1$, hereinafter referred to as compensating table, being formed through a composition, using the Abelian group operator, that includes the table C.

12. An execution device for use in the system as claimed in claim 8, wherein a cryptographic function F is provided to the execution device in an obfuscated form; the function F cryptographically converting an input x from a predetermined domain D to an output y using a plurality of non-linear mapping tables $T_i$($0 \leq i \leq n$; $n \geq 1$), each with key-like information and operating on a respective part $D_i$ of the domain D, the function F composing output of the mapping tables using an Abelian group operator $\otimes$; the executing device including:

means for receiving a plurality of tables $T'_i$, $0 \leq i \leq m$; $n \leq m \leq n+1$, where for $0 \leq i \leq n$, each table $T'_i$ represents the respective corresponding table $T_i$ and at least one of those tables $T'_{o_1}$, $0 \leq o_1 \leq n$, hereinafter referred to as obfuscated table, being formed through a composition, using the Abelian group operator, of the corresponding table $T_{o_1}$ and a table O, and at least one of the other tables $T'_{c_1}$, $0 \leq c_1 \leq m$, $c_1 \neq o_1$, hereinafter referred to as compensating table, being formed through a composition, using the Abelian group operator, that includes a table C, where $C[x] \otimes O[x]=0$, $\forall x \in D_i$; and a processor for, under control of a program, forming a function F' that is functionally equivalent to the cryptographic function F by composing the plurality of tables $T'_i$, $0 \leq i \leq m$, using the Abelian group operator, such that the tables O and C are compensated through the composition.

13. A computer program product stored on a non-transitory medium for controlling a processor in an execution device, providing a cryptographic function F to the execution device in an obfuscated form; the function F cryptographically converting an input x from a predetermined domain D to an output y, wherein y=F(x) and using a plurality of non-linear mapping tables $T_i$($0 \leq i \leq n$; $n \geq 1$), each with key-like information and operating on a respective part $D_i$ of the domain D, the function F composing output of the mapping tables using an Abelian group operator $\otimes$; receiving the cryptographic function F in an obfuscated form including a plurality of tables $T'_i$, $0 \leq i \leq m$; $n \leq m \leq n+1$, where for $0 \leq i \leq n$, each table $T'_i$ represents the respective corresponding table $T_i$ and at least one of those tables $T'_{o_1}$, $0 \leq o_1 \leq n$, hereinafter referred to as obfuscated table, being formed through a composition, using the Abelian group operator, of the corresponding table $T_{o_1}$ and a table O, and at least one of the other tables $T'_{c_1}$, $0 \leq c_1 \leq m$, $c_1 \neq o_1$, hereinafter referred to as compensating table, being formed through a composition, using the Abelian group operator, that includes a table C, where $C[x] \otimes O[x]=0$, $\forall x \in D_i$;

wherein the computer program product including program instructions to cause the processor to perform the steps of: forming a function F' that is functionally equivalent to the cryptographic function F by composing the plurality of tables $T'_i$, $0 \leq i \leq m$, using the Abelian group operator, such that the tables O and C are compensated through the composition.

14. The method according to claim 1, wherein the function F equals $F(x)=T_0[x_0] \otimes \ldots \otimes T_n[x_n]$, $x=(x_0, x_1, \ldots, x_n)$, $x_i \in D_i$, wherein $T'_i$, wherein $i=o_1$, equals $T'_{o_1}[x]=O[x] \otimes T_{o_1}[x]$, $\forall x \in D_{o_1}$, and wherein $T'_{c_1}$ equals $T'_{c_1}[x]=C[x] \otimes T_{c_1}[x]$, $\forall x \in D_{c_1}$.

15. The method according to claim 4, wherein $T'_{o_2}$ equals $T'_{o_2}[x]=O_2[x] \otimes T_{o_2}[x]$, $\forall x \in D_{o_2}$ and wherein $T'_{c_1}[x]=C_2[x] \otimes C[x] \otimes T_{c_1}[x]$, $\forall x \in D_{c_1}$.

16. The method according to claim 7, wherein $D'_{n+1}$ equals $D'_{n+1}[x] = D_{o_1} \otimes D_{o_2} \otimes D_{o_3}[x]$, $\forall x$ and wherein $T'_i[x] \otimes T_i[x]$, $x \in D_i$.

17. The system according to claim 8, wherein the function F equals $F(x) = T_0[x_0] \otimes \ldots \otimes T_n[x_n]$, $x = (x_0, x_1, \ldots, x_n)$, $x_1 \in D_i$, wherein $T'_{o_1}$ equals $T'_{o_1}[x] = O[x] \otimes T_{o_1}[x]$, $\forall x \in D_{o_1}$, and wherein $T'_{c_1}$ equals $T'_{c_1}[x] = C[x] \otimes T_{c_1}[x]$, $\forall x \in D_{c_1}$.

18. The server according to claim 10, wherein the function F equals $F(x) = T_0[x_0] \otimes \ldots \otimes T_n[x_n]$, $x = (x_0, x_1, \ldots, x_n)$, $x_i \in D_i$, wherein $T'_{o_1}$ equals $T'_{o_1}[x] = O[x] \otimes T_{o_1}[x]$, $\forall x \in D_{o_1}$, and wherein $T'_{c_1}$ equals $T'_{c_1}[x] = C[x] \otimes T_{c_1}[x]$, $\forall x \in D_{c_1}$.

19. The computer program product according to claim 11, wherein the function F equals $F(x) = T_0[x_0] \otimes \ldots \otimes T_n[x_n]$, $x = (x_0, x_1, \ldots, x_n)$, $x_i \in D_i$, wherein $T'_{o_1}$ equals $T'_{o_1}[x] = O[x] \otimes T_{o_1}[x]$, $\forall x \in D_{o_1}$, and wherein $T'_{c_1}$ equals $T'_{c_1}[x] = C[x] \otimes T_{c_1}[x]$, $\forall x \in D_{c_1}$.

20. The execution device according to claim 12, wherein the function F equals $F(x) = T_0[x_0] \otimes \ldots \otimes T_n[x_n]$, $x = (x_0, x_1, \ldots, x_n)$, $x_i \in D_i$, wherein $T'_{o_1}$ equals $T'_{o_1}[x] = O[x] \otimes T_{o_1}[x]$, $\forall x \in D_{o_1}$, and wherein $T'_{c_1}$ equals $T'_{c_1}[x] = C[x] \otimes T_{c_1}[x]$, $\forall x \in D_{c_1}$.

21. The computer program product according to claim 13, wherein the function F equals $F(x) = T_0[x_0] \otimes \ldots \otimes T_n[x_n]$, $x = (x_0, x_1, \ldots, x_n)$, $x_i \in D_i$, wherein $T'_{o_1}$ equals $T'_{o_1}[x] = O[x] \otimes T_{o_1}[x]$, $\forall x \in D_{o_1}$, and wherein $T'_{c_1}$ equals $T'_{c_1}[x] = C[x] \otimes T_{c_1}[x]$, $\forall x \in D_{c_1}$.

* * * * *